March 23, 1926. 1,577,700

A. J. EDWARDS

VISION DEFLECTOR

Filed April 12, 1924

Inventor:
A. J. Edwards,
By Egerton R. Case,
Atty.

Patented Mar. 23, 1926.

1,577,700

UNITED STATES PATENT OFFICE.

ARTHUR JAMES EDWARDS, OF TORONTO, ONTARIO, CANADA.

VISION DEFLECTOR.

Application filed April 12, 1924. Serial No. 706,024.

*To all whom it may concern:*

Be it known that I, ARTHUR JAMES EDWARDS, a subject of the King of Great Britain, residing in the city of Toronto, in the county of York, Province of Ontario, Canada, have invented certain new and useful Improvements in Vision Deflectors, of which the following is a specification.

My invention relates to improvements in vision deflectors, and the object of my invention is to provide a device of the character set forth which will intercept or deflect light rays so that the wearer of the device may have a clear or unimpaired vision of the roadway irrespective of the position of sources of visible light that may be in front of him and to either or both sides of his path of travel, and in the following specification I shall describe a disclosure within my invention, and what I claim as new will be set forth in the claims forming part of this specification.

Figures 1, 2:
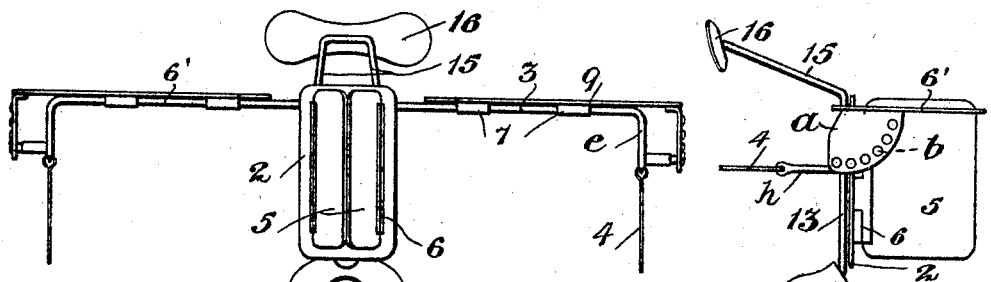
Figure 3:
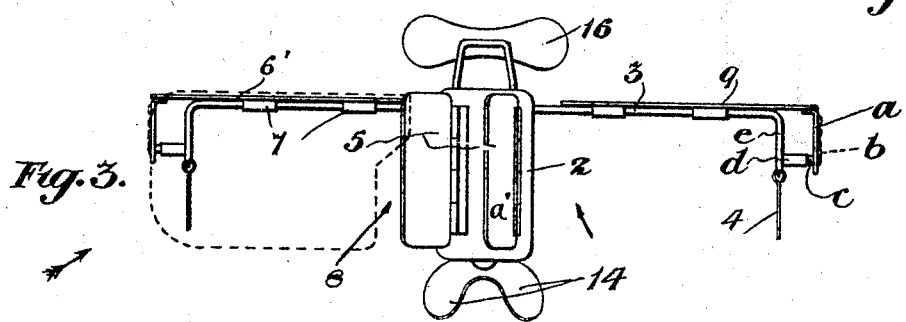
Figure 4:
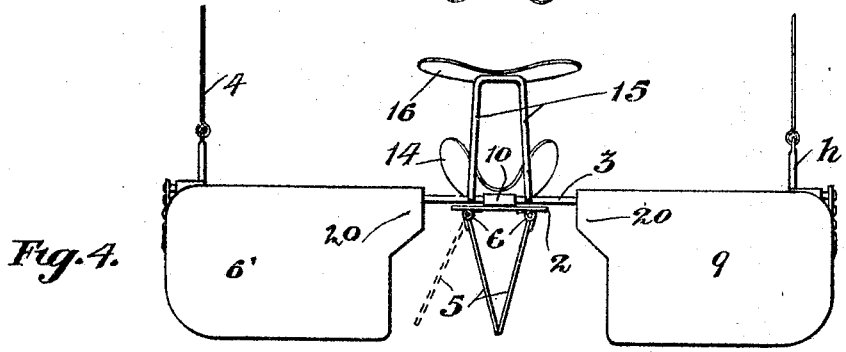
Figure 5:
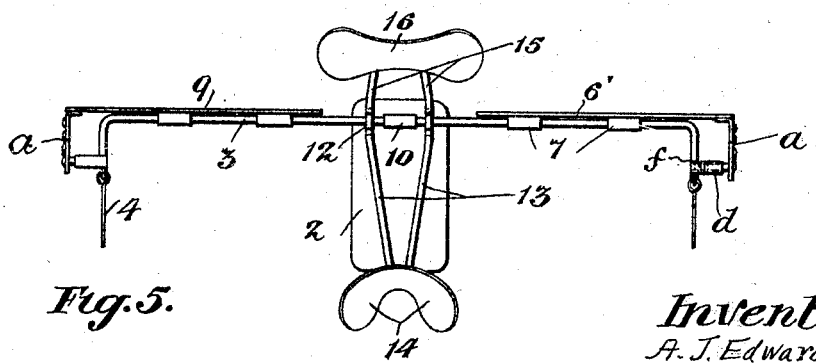

Fig. 1 is a front elevation of my device, and Fig. 2 is an end elevation thereof. Fig. 3 is a view similar to Fig. 1, showing the position of one of the deflectors when in use. Fig. 4 is a plan view of the device with the parts in the position shown in Fig. 1, and Fig. 5 is a rear elevation of the device, with the parts in the position shown in Fig. 1.

In the drawings, like characters of reference refer to the same parts.

Although I preferably make the light-intercepting or deflecting-elements in my device of opaque material, still they need not essentially be opaque, because certain translucent material can be made use of, such as stout oiled paper.

The device of course will be made as light as possible, and in its essence it comprises a support which will hereinafter be referred to for convenience as a nose-plate 2 which is adapted to be supported in operative position by any suitable means. The preferred means to perform this function comprises a bar 3, which bar is adapted to be directly coupled to the head of the wearer, or to any other support. When this bar is coupled directly to the head of the wearer, it will be provided with the usual coupling members 4 which are adapted to be passed over the ears.

Movably associated with the nose-plate 2 are a pair of deflectors 5 which are disposed longitudinally of said nose-plate and substantially equidistant of the vertical centre of said support or nose plate, and are capable of being independently moved. These deflectors are shown as coupled to the plate 2 by any suitable type of hinge 6. The position of the deflectors shown in Fig. 1 is that of non-use, and the width of the nose-plate 2 is of course such that the vision from neither of the eyes will be impaired thereby. If it be supposed that light rays are coming from a source of light in the direction indicated by plain arrow in Fig. 3, the right-hand deflector 5 will be moved into the position shown in Fig. 3 to intercept the light rays before they reach the right eye.

If light rays shine in the face of the driver in the directions indicated by both arrows in Fig. 3, the vision of the right eye of course would be practically destroyed unless some means be provided to intercept the light rays travelling in the direction indicated by arrow with tail. Now in order to intercept or deflect these last-mentioned light rays, I provide a vizor 6' which is movably coupled to the bar 3 by any suitable means, such as the hinged members 7. When this vizor 6' is moved into the dotted position shown in Fig. 3, it will intercept or deflect the said light rays moving in the direction indicated by arrow with tail. The inner end of this vizor is constructed or formed so that when this vizor is in the position under consideration there will be an unobstructed passage-way 8 between the inner end of this vizor and the nose-plate 2, to allow for clear vision of the right eye. And when the deflector $a'$ is moved to the left into substantially the position of its companion deflector, light rays travelling in the direction of arrow with tail will not reach the left eye.

There is also a vizor 9 for use in association with the left eye, and this is mounted in the manner before described and functions like the vizor 6'. Should the light rays come in the directions opposite to those just considered, the manner in which the vizors and deflectors should be used will be clearly understood.

Of course a passage-way is left for vision between the deflector $a'$ and the vizor 9, and it will be understood that the width of this passage-way and the passage-way 8 can be determined, by the position of their associated deflectors. It will be observed that each vizor is provided at its inner end with an extension 20. These extensions may be omitted, but I have found in practice that they provide a certain amount of protection to the eye against overhead light rays when vision is had through the passage-ways, such as 8.

The vizors 6' and 9 are very useful in travelling facing the sun light and can be adjusted as required.

The said vizors are also capable of movement longitudinally on the bar 3 so as to provide for any adjustment that may be necessary owing to the distance between the pupils of the eyes.

To also increase the range of adjustment for this device, the nose-plate 2 may be, if desired, movably coupled to the bar 3 as by a hinged member 10 located at the upper end of said nose-plate.

In order to hold the light-deflecting or intercepting-members more or less firmly in place, I give support to the bar 3 from the nose and forehead of the wearer, and the preferred means for this purpose comprises any suitable frame suitably coupled after any suitable manner, (or integrally forming a part thereof) to the bar 3 as shown diagrammatically at 12. This frame comprises two vertically-disposed members 13 which support at their lower ends the nose-plate 14, which straddles the nose. The said frame also comprises members 15 located at a rearwardly extending angle to the members 13 and supporting the plate 16 which rest against the forehead. Now in combination with the coupling members 4 passed over the ears, the plate 14 and 16 supported as described give the desired support to the light-deflecting or intercepting-members already mentioned.

Any suitable means may be employed to hold the vizors 6' and 9 in adjusted positions, and a convenient means for this purpose comprises quadrant plates $a$ associated with the outer end of each vizor and projecting beyond the inner side thereof. These quadrant plates are notched as shown at $b$, and adapted to engage the notches of each quadrant plate is a pin $c$ each of which is mounted to have movement within a housing $d$, each of which housings is coupled after any suitable manner to each offset end $e$ of the bar 3. $f$ are springs mounted within each housing $d$, and these maintain the pins $c$ in operative position. The parts just described are well-known in various arts and need no further elaboration.

The ends $e$ normally extend below the bar 3, and integrally formed with each offset end $e$ is an extension $h$, which extensions project rearwardly of the bar 3, and it is to these extensions that the coupling members 4 are connected.

Obviously if a person have only one eye capable of vision the wearer only needs the nose-plate 2 or its equivalent, one of the deflectors 5, and one of the vizors.

It is quite conceivable that under certain given conditions, for instance, where an electric roadway be not paralleling closely the motor highway, the use of the vizors 6' and 9 will not be required, and therefore these vizors may be omitted from the device.

It will be observed that the light-intercepting or deflecting-members 5 are moved through a substantially horizontal plane, whereas the vizors 6' and 9 when used are moved through a vertical plane.

It is not absolutely essential to movably associate the nose-plate 2 with the bar 3, though greater flexibility in use of the device is had if this be done.

It must be understood that the disclosure herein of a device having the movements described is not to be considered as binding beyond what is set forth in the following claims.

What I claim is:

1. A device of the class described comprising a substantially vertically disposed elongated nose plate intended to be located when in use in front of the nose; a pair of elongated deflectors each hinged at its rear longitudinal edge to said nose plate to extend longitudinally thereof and so as to be moved each in a substantially horizontal plane, said deflectors being located substantially equidistant of the vertical centre of said support, and positioned convergently when not in use, and supporting means for said nose plate adapted to hold the same and said deflecting plates in operative position, said supporting means including a frame-work, a nose-engaging plate carried by the frame-work, and ear-engaging members carried by the frame-work.

2. A device of the class described comprising a nose-plate; means adapted to support said nose-plate in co-operative relationship to the nose; means movably associated with said nose-plate and operating in front of the same to intercept light rays, and suitable vizors independently movably coupled to the supporting means for said nose-plate, at each side thereof.

3. A device of the class described comprising a nose-plate; means adapted to movably support said nose-plate in co-operative relationship to the nose; means movably associated with said nose-plate and operating in front of the same to intercept light rays, and suitable vizors independently movably coupled to the supporting means for said nose-plate, at each side thereof.

4. A device of the class described comprising a substantially vertically-disposed nose-plate; means adapted to support said nose-plate at its upper end and in co-operative relationship to the nose; a pair of light-intercepting devices hinged to said nose-plate projecting forwardly thereof; a vizor having hinged connection with the supporting means for said nose-plate at each side of said nose-plate, the inner ends of said vizors being shaped to permit vision thereby.

5. A device of the class described comprising a substantially vertically-disposed nose-plate; means adapted to support said nose-plate in co-operative relationship to the nose, embracing a bar to which the upper end of said nose-plate is movably coupled; plates adapted to rest respectively on the forehead and nose; means holding said plates in co-operative relationship with said nose-plate and bar, and light-deflecting means movably associated with said nose-plate and operating beyond the forward side thereof.

ARTHUR JAMES EDWARDS.